US009961212B2

(12) United States Patent
Li et al.

(10) Patent No.: US 9,961,212 B2
(45) Date of Patent: May 1, 2018

(54) POLICY AND CHARGING CONTROL METHOD AND APPARATUS FOR AN APPLICATION SERVICE CHAIN BASED ON AN SDN NETWORK

(71) Applicant: Alcatel Lucent, Boulogne-Billancourt (FR)

(72) Inventors: Xiangyang Li, Shanghai (CN); Yigang Cai, Naperville, IL (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days. days.

(21) Appl. No.: 15/320,588

(22) PCT Filed: May 22, 2015

(86) PCT No.: PCT/IB2015/000961
§ 371 (c)(1),
(2) Date: Dec. 20, 2016

(87) PCT Pub. No.: WO2016/001727
PCT Pub. Date: Jan. 7, 2016

(65) Prior Publication Data
US 2017/0201629 A1    Jul. 13, 2017

(30) Foreign Application Priority Data
Jul. 2, 2014    (CN) .......................... 2014 1 0312969

(51) Int. Cl.
*H04M 11/00*    (2006.01)
*H04M 15/00*    (2006.01)
*H04L 12/24*    (2006.01)

(52) U.S. Cl.
CPC ........ *H04M 15/66* (2013.01); *H04L 41/0893* (2013.01); *H04L 41/5054* (2013.01)

(58) Field of Classification Search
CPC . H04M 15/66; H04L 41/0893; H04L 41/5054
(Continued)

(56) References Cited

U.S. PATENT DOCUMENTS 9,258,742 B1 * 2/2016 Pianigiani ............. H04L 67/327
9,641,346 B2 * 5/2017 Li ......................... H04L 43/028
(Continued)

FOREIGN PATENT DOCUMENTS

CN    102907066 A    1/2013
EP      2613597 A1    7/2013
(Continued)

OTHER PUBLICATIONS

International Search Report PCT/ISA/210 for International Application No. PCT/IB2015/000961 dated Nov. 6, 2015.
(Continued)

*Primary Examiner* — Khai M Nguyen
(74) *Attorney, Agent, or Firm* — Harness, Dickey & Pierce, P.L.C.

(57) ABSTRACT

A policy and charging control function PCRF determines an application service chain for an application based on multi-dimensional context information corresponding to the application, and transmits the corresponding application service chain information to an SDN controller. The SDN controller determines a forwarding rule for the application based on the application service chain information, and transmits the forwarding rule to a corresponding service chaining infrastructure network. SCEP(s) in the service chaining infrastructure network perform corresponding service function based on the forwarding rule.

13 Claims, 4 Drawing Sheets

(58) Field of Classification Search
USPC .................................. 455/406, 405, 408
See application file for complete search history.

(56) References Cited

U.S. PATENT DOCUMENTS

| | | |
|---|---|---|
| 2012/0030331 A1 | 2/2012 | Karampatsis |
| 2012/0314632 A1 | 12/2012 | Martinez De La Cruz et al. |
| 2014/0010084 A1 | 1/2014 | Kavunder et al. |
| 2014/0010085 A1 | 1/2014 | Kavunder et al. |
| 2014/0086052 A1* | 3/2014 | Cai ...................... H04L 47/748 370/235 |
| 2014/0376412 A1 | 12/2014 | Li et al. |
| 2015/0005004 A1 | 1/2015 | Cuervo et al. |
| 2015/0334027 A1* | 11/2015 | Bosch .................... H04L 45/38 370/230 |
| 2016/0283290 A1* | 9/2016 | Porat ....................... G06F 9/54 |

FOREIGN PATENT DOCUMENTS

| | | |
|---|---|---|
| KR | 20130027501 A | 3/2013 |
| WO | WO-2011101021 A1 | 8/2011 |
| WO | WO-2011/147486 A1 | 12/2011 |
| WO | WO-2013108138 A1 | 7/2013 |
| WO | WO-2013/166625 A1 | 11/2013 |

OTHER PUBLICATIONS

Ericsson, "Details on Key Issue 4 for TDF co-located," 3GPP TSG SA WG2 Meeting #80, Aug. 30-Sep. 3, 2010, Brunstad, Norway, pp. 1-7.

\* cited by examiner

POLICY AND CHARGING CONTROL METHOD AND APPARATUS FOR AN APPLICATION SERVICE CHAIN BASED ON AN SDN NETWORK

CROSS-REFERENCE TO RELATED APPLICATIONS

This application is the U.S. National Phase application of PCT Application No. PCT/IB2015/000961 filed on May 22, 2015, which claims priority to Chinese Patent Application No. 201410312969.2 filed on Jul. 2, 2014, the entire contents of each of which are incorporated herein by reference

FIELD OF THE INVENTION

The present invention relates to the field of communication technology, and more specifically, to a policy and charging control technology for an application service chain based on an SDN network.

BACKGROUND OF THE INVENTION

Policy and Charging Control (PCC) includes a policy server, such as PCRF (Policy and Charging Rule Function), and a policy enforcement function, such as PCEF (Policy and Charging Enforcement Function) or TDF (Traffic Detection Function). The policy enforcement function performs deep packet inspection to detect the application traffic (e.g., inspecting the traffic of applications such as facebook, google email, and the like) or performs dynamic QoS and charging control. The policy enforcement function is also connected to a charging system and a subscriber database, to help operators dynamically control the way the subscribers and applications consume data network resources. A policy decision can be based on a wide variety of triggers, including a subscriber's data volume usage, service tier, location information, application, URL, source IP address, time of day, congestion level and so on. The PCC architecture is a now well established in 4G LTE EPC core network.

Specifically, considering the deployment of a software-defined network (SDN), packet forwarding is separated from control function. The control function is separated from a dedicated network device and enforced by a central "container," e.g., SDN controller. The SDN controller will tell a packet forwarding device how to transmit application data flows using a standard protocol, such as OpenFlow protocol. A key objective of SDN is to facilitate network development and application virtualization.

The deployment of policy control and subsequently new emerging SDN raise some important issues for how carriers control the way service are supported and delivered to an end user. The current network service deployment models are relatively static, and bound to topology for insertion and policy selection. Furthermore, they are not adapted well to elastic service environments enabled by virtualization.

SUMMARY OF THE INVENTION

An objective of the present invention is to provide a policy and charging control method and apparatus for an application service chain based on an SDN network.

According to one aspect of the present invention, there is provided a policy and charging control method for an application service chain based on an SDN network, wherein the method comprises:

a. determining, by a PCRF, an application service chain for an application based on multi-dimensional context information corresponding to the application, and transmitting the corresponding application service chain information to an SDN controller;

b. determining, by the SDN controller, a forwarding rule for the application based on the application service chain information, and transmitting the forwarding rule to a corresponding service chaining infrastructure network;

c. performing, by SCEP(s) in the service chaining infrastructure network, corresponding service function based on the forwarding rule.

According to another aspect of the present invention, there is provided a PCRF for policy and charging control to an application service chain based on an SDN network, wherein the PCRF is configured to determine an application service chain for an application based on the multi-dimensional context information corresponding to the application, and transmit the corresponding application service chain information to an SDN controller.

According to another aspect of the present invention, there is provided an SDN controller for policy and charging control to an application service chain based on an SDN network, wherein the SDN controller is configured to:
  receive application service chain information transmitted by a corresponding PCRF;
  determine a forwarding rule for a corresponding application based on the application service chain information and transmit the forwarding rule to a corresponding service chaining infrastructure network.

According to another aspect of the present invention, there is provided SCEP(s) for policy and charging control to an application service chain based on an SDN network, wherein the SCEP is configured to perform corresponding service function based on a forwarding rule transmitted by an SDN controller.

According to another aspect of the present invention, there is provided a TDF for policy and charging control to an application service chain based on an SDN network, wherein the TDF includes an ingress SCEP; the TDF performs a deep packet inspection to the application flow of an application so as to perform diffluent processing to the application flow, and forwards the application flow to other SCEP(s); wherein the TDF further receives application service chain information transmitted by the PCRF and transmits a charging request comprising the application service chain information to a corresponding OCS and/or OFCS, so as to charge the application.

According to a further aspect of the present invention, there is provided a system for policy charging and control to an application service chain based on an SDN network, comprising a PCRF above, an SDN controller above, an SCEP above, and a TDF above.

Compared with the prior art, according to the present invention, in an SDN network, the PCRF determines an application service chain and transmits the corresponding information to the SDN controller. The SDN controller determines a forwarding rule based thereupon and transmits it to a service chaining infrastructure network. Based on the forwarding rule, each SCEP in the service chaining infrastructure network performs a corresponding service function. The present invention is an unprecedented proposal changing the game rule of LTE policy and charging control method having a value added service chain, which enhances the existing 3GPP LTE/EPS architecture and policy control and supports the SDN OpenFlow and service chain.

Further, the present invention extends the PCRF capabilities, such that it not only defines application detection and control (ADC) rules for QoS control and charging, but also supports determination of an application service chain for each application. Therefore, the PCRF may bind an application to an associated service chain in consideration of subscriber multi-dimension attributes (such as customer segmentation, data charging plan, location, access technology, age, time period, . . . ). In this way, the PCRF may dynamically define a corresponding application service chain for the application and subscriber.

The present invention provides a policy control service chain mechanism to control the way the valued added service is deployed in SDN controlled network, and extend a SDN forwarding policy rule for network flow control and application-oriented flow control, so as to include subscriber preferences, profile and network condition. Subscriber awareness will be required at an interface between a control plane and a data plane to ensure that the operator can continue to honor service guarantees to subscribers. Per-subscriber policy based on a service chain provides a flexible way of service provisioning and facilitates their deployment.

This invention also enables operators to dynamically charge different application flows with different valued added service functions.

BRIEF DESCRIPTION OF THE ACCOMPANYING DRAWINGS

Other features, objectives, and advantages of the present invention will become more apparent through reading the following detailed depiction on the non-limiting embodiments with reference to the accompanying drawings.

Figure 1:
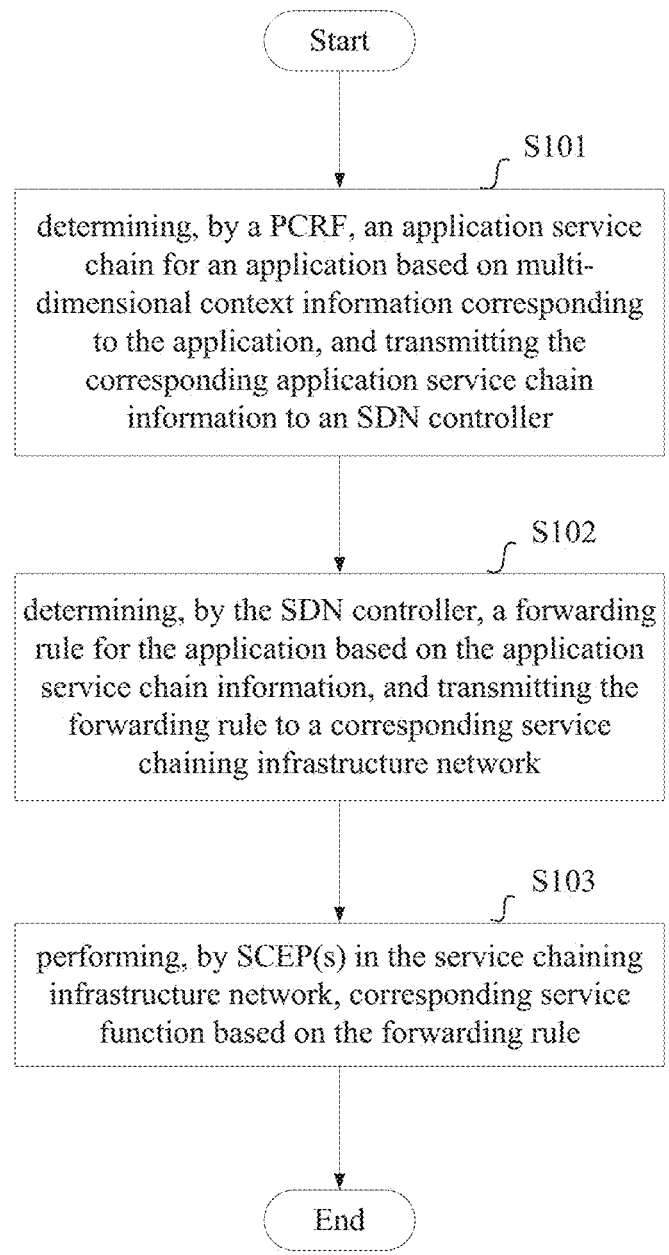
FIG. 1 shows a flow chart of a policy and charging control method for an application service chain based on an SDN network according to one aspect of the present invention.

In the drawings, same or like reference signs represent same or like components.

DETAILED DESCRIPTION OF THE PREFERRED EMBODIMENTS

Hereinafter, the present invention will be further described in detail with reference to the accompanying drawings.

FIG. 1 shows a flow chart of a policy and charging control method for an application service chain based on an SDN (Software-Defined Network) network according to one aspect of the present invention.

In step S101, the PCRF determines an application service chain for an application and transmits corresponding application service chain information to an SDN controller.

Specifically, in step S101, the PCRF determines an application service chain for an application, for example, determining a corresponding service function for the application, or further, determining a corresponding application service chain based on multi-dimension context information corresponding to the application, and even further, the PCRF transmits the application service chain information to an SDN controller of an SDN network.

Here, the application service chain is an ordered list of service functions. The list may be rearranged. The concept of application service chain includes applying a plurality of service functions in a particular sequence. The service function may be used individually or used together with other service functions in the application service chain, such that the services provided by network carriers are available.

Here, the PCRF has an open API so as to interact with the SDN controller. Therefore, the PCRF may transmit application service chain information to the SDN controller.

Here, the PCRF capabilities are extended, which may not only define application detection and control rules for QoS control and charging, but also support determination of an application service chain for each application. Further, the PCRF may also bind an application to an associated service chain in consideration of subscriber multi-dimension attributes (such as customer segmentation, data charging plan, location, access technology, age, time period, . . .). In this way, the PCRF may dynamically define a corresponding application service chain for the application and subscriber.

Those skilled in the art should understand that the above manner of determining or transmitting an application service chain is only exemplary, and other existing or future possibly emerging manners of determining or transmitting an application service chain, if applicable to the present invention, should also be included within the scope of the present invention and are incorporated here by reference.

Preferably, in step S101, the PCRF determines an application service chain of the application based on multi-dimension context information corresponding to the application.

Specifically, in step S101, the PCRF determines the corresponding application service chain based on the multi-dimension context information corresponding to the application, such as the above customer segmentation, data charging plan, location, access technology, age, time period, and the like, for example, the application service chain resulting from the above consideration of the multi-dimension context information is called a value added application service chain, and transmits the value added application service chain to the SDN controller.

More preferably, the multi-context information comprises at least one of the following:

TDF application context information;
subscriber repository context information;
subscriber charging information;
subscriber radio access and location information.

Here, the TDF application context information: e.g., application flow description information layer 3 to layer 7, application sponsorship information, etc. The TDF application flow information can be obtained from the Application Function (AF) via Rx interface, or TDF application flow information can be detected by TDF and sent to PCRF to request ADC rule via Sd interface.

Here, the subscriber repository context information: e.g., subscriber allowed value added service, service priority, subscriber allowed QoS, subscriber category (enterprise, personal, adult, young, etc.), age, birthday, etc. The subscriber repository context information can be got from subscriber information database such as HSS (home subscriber server)/SPR (subscriber profile repository) via Sp interface per 3GPP PCC architecture. For example, the teenage user will perform the parental control value added service function, and the enterprise user will have the enterprise security service function, and the like.

Here, subscriber charging information: e.g., policy based spending counter status, which can be gotten via Sy interface with OCS.

Here, the multi-dimensional context information may also comprise subscriber radio access and location information: PCRF can acquire mobile network information such as radio access type and user location information from PGW. With this information, the PCRF can define service chain for subscriber's application. For example, when the user has a 3G/4G connection, the video traffic is steered via a video optimizer for smooth video streaming under low bandwidth condition. When the user has a WLAN connection, the video traffic needs no specific optimization and can be routed straight from the source to the user device.

In step S101, the PCRF determines an application service chain of the application based on any of the above multi-dimensional context information corresponding to the application.

Those skilled in the art should understand that the above multi-dimension context information is only exemplary, and other existing or future possibly emerging multi-context information, if applicable to the present invention, should also be included within the protection scope of the present invention and is incorporated here by reference.

Preferably, based on the above multi-dimensional context information, the PCRF can add the value added service chain into the ADC rule on a given application flow. The enhanced ADC rule will contain at least any one of the following information:

ADC rule identifier;
TDF application identifier;
Monitoring key;
Gate status;
QoS Information, e.g. UL maximum bit rate; DL maximum bit rate;
Charging Information, e.g. rate, online/offline charging or metering method;
Redirect Information;
Sponsored information;
Value Added Service Chain information.

Here, the value added service chain information AVP in ADC rules will include:

1) The service chain ID for the TDF application. The service chain ID will be new AVP and used for new tariff plan in Rating Engine.

2) One and more service functions with the specified traverse order.

Those skilled in the art should understand that the information included in the enhanced ADC rule is only exemplary, and other existing or future possibly emerging information included in the enhanced ADC rule, if applicable to the present invention, should also be included within the protection scope of the present invention and is incorporated here by reference.

In step S102, the SDN controller determines a forwarding rule for the application based on the application service chain information and transmits it to the corresponding service chaining infrastructure network.

Specifically, in step S102, the SDN controller determines a forwarding rule for the application based on the application service chain information received from the PCRF in step S101, which forwarding rule, for example, includes how to perform a service function corresponding to the application service chain, the sequence of performing the service functions, etc., and then the SDN controller transmits the forwarding rule to the corresponding service chaining infrastructure network.

Here, the service chaining infrastructure network is a network composed of interconnecting SCEP(s) and service functions. A service function here is a network or application based packet treatment, application, computation or storage resource.

Here, the SDN controller may dynamically define a packet data forwarding rule for each subscriber's application flow. These forwarding rules steer the classified traffic flows to perform corresponding service functions in specific order as defined by the application service chain from PCRF.

In step S103, the SCEP(s) in the service chaining infrastructure network perform corresponding service function based on the forwarding rule.

Here, the SCEP may be a physical node or a virtual node to perform a corresponding service function based on the forwarding rule. After a service function is performed, the SCEP forwards the data packet to the next SCEP for further packet handling.

Preferably, in step S103, the SCEPs in the service chaining infrastructure network perform corresponding service functions in sequence based on the service function performing sequence in the forwarding rule.

Specifically, the forwarding rule includes performing sequence of service functions, and each SCEP performs the corresponding service functions in sequence based on the performing sequence.

Figure 2:
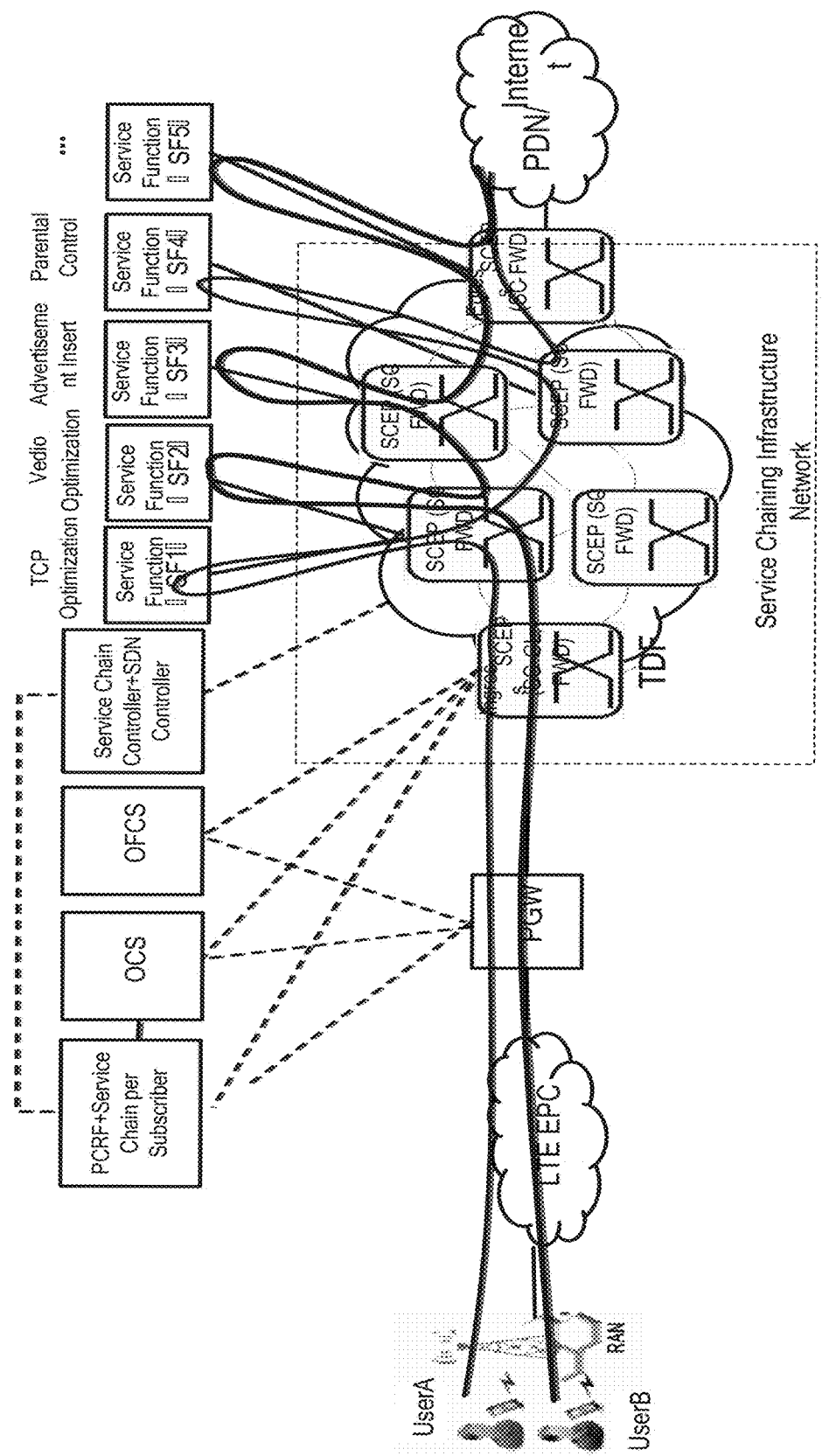
FIG. 2 shows a schematic diagram of performing policy and charging control to an application service chain based on an SDN network according to one of the preferred embodiment of the present invention.

For example, FIG. 2 shows an application data traffic of two subscribers, wherein different applications correspond to different service chains. After the PCRF determines an application service chain for the application, the application service chain information is transmitted to the SDN controller; the SDN controller determines different forwarding rules for the two subscribers based on the application service chain information, and transmits the forwarding rule to the service chaining infrastructure network; in the service chaining infrastructure network, different SCEPs corresponding to the two applications perform corresponding service functions based on the forwarding rule, respectively.

For example, the application of subscriber A (upper subscriber) corresponds to service function 1 and service function 4. After the PCRF determines a service application chain for the subscriber A, it sends the application service chain to the SDN controller; the SDN controller determines a forwarding rule to the subscriber A based on the application service chain information. Here, the TDF acts as an ingress SCEP. Two SCEPs in the upper row are called SCEP 1 and SCEP 2 from left to right; three SCEPs in the lower row are called SCEP3, SCEP4 and SCEP5 from left to right, respectively; then the forwarding rule, for example, defines the forwarding sequence of the application flow as from the ingress SCEP to SCEP1, and then from SCEP 1 to SCEP 4. After the SDN controller transmits the forwarding rule to the service chaining infrastructure network, the SCEPs in the service chaining infrastructure network perform corresponding service functions based on the forwarding rule. For example, the ingress SCEP performs diffluent processing and forwards the application flow to the SCEP1 which performs data packet processing to the received application flow so as to perform service function 1, and then forwards the application flow to the SCEP4. The SCEP 4 performs data packet processing to the received application flow to perform service function 4.

Similarly, the application of subscriber B (lower subscriber) corresponds to service function 2, service function 3, and service function 5. After the PCRF determines a service application chain for the subscriber B, it sends the application service chain to the SDN controller; the SDN controller determines a forwarding rule to the subscriber B based on the application service chain information. For example, the forwarding rule defines the forwarding sequence of the application flow as from the ingress SCEP to SCEP1, then from SCEP 1 to SCEP 2, and then from the SCEP 2 to SCEP 5. After the SDN controller transmits the forwarding rule to the service chaining infrastructure network, the SCEPs in the service chaining infrastructure network perform corresponding service functions based on the forwarding rule. For example, the ingress SCEP performs diffluent processing and forwards the application flow to the SCEP1 which performs data packet processing to the received application flow so as to perform service function 2, and then forwards the application flow to the SCEP2. The SCEP 2 performs data packet processing to the received application flow to perform service function 3 and then forwards the application flow to SCEP 5 which performs data packet processing to the received application so as to perform service function 5.

Here, the SCEP guarantees that the service functions of a list are traversed in a specific order. The specific order corresponds to application flows associated with the service function chain.

Those skilled in the art should understand that the above manner of performing service functions is only exemplary, and other existing or further possibly emerging manners of performing service functions, if applicable to the present invention, should also be included within the protection scope of the present invention and are incorporated here by reference.

Preferably, the SCEP includes a service chaining classification function and a service chaining forwarding function, wherein the service chaining classification function performs diffluent processing to the application flow of the application; and the service chaining forwarding function transmits the application flow to the service function and/or other SCEP(s).

Specifically, the SCEP includes a service chaining classification function (SC-CL) and a service chaining forwarding function (SC-FWD), wherein the service chaining classification function is a logical function part of an SCEP node to perform diffluent processing to the application flow of the application. When the data packet enters into the ingress SCEP, the SC-CL is mandatory to execute. The SC-CL classifies the incoming data packets/frames into different service flows based on their service characteristics or other policies.

The service chaining forwarding function (SC-FWD) is a logical function part of an SCEP node, to forward the application flow to the service function and/or other SCEP(s). The service chaining forwarding function is responsible for forwarding data packets to a service function, forwarding data packets to other SCEP nodes and to remove SC-IN (Service Chaining Infrastructure Network) specific information from data packets when there is an egress SC-IN. SC-FWD is mandatory to execute in all SCEP nodes.

Preferably, the ingress SCEP in the SCEPs includes TDF. The TDF receives the application service chain information transmitted by the PCRF and transmits a charging request comprising the application service chain information to the corresponding OCS and/or OFCS, so as to charge the application.

Specifically, the TDF may act as an ingress SCEP. The TDF receives application service chain information transmitted from the PCRF via an Sd interface, and then the TDF transmits a charging request to the corresponding OCS via a Gyn interface, or transmits the charging request to the corresponding OFCS via a Gzn interface. The charging request includes the application service chain information. Next, the OCS and/or OFCS charge the application.

Here, besides passing the subscriber application flow and related value added service chain to the SDN, PCRF will also pass the service chain information in ADC rule to TDF/PECF. When the service chain information is obtained in TDF/PCEF, TDF/PCEF can send a charging request comprising the service chain information to an online charging system (OCS) and/or an offline charging system (OFCS). In this way, the OCS and/or OFCS can apply different charging plans to different applications with different application service chains. A brand new service chain information AVP (an AVP which contains a Service Chain ID) shall be added in Ro and Rf interfaces for the charging request. The service chain information AVP will allow a new charging mechanism within OCS and OFCS to charge the SDN open flow and service chaining accordingly. In this way, a carrier may provide different charging rules for applications having different QoS and different value added service functions.

Here, the TDF may be standalone or integrated with a PGW (Packet Gateway).

Figure 3:
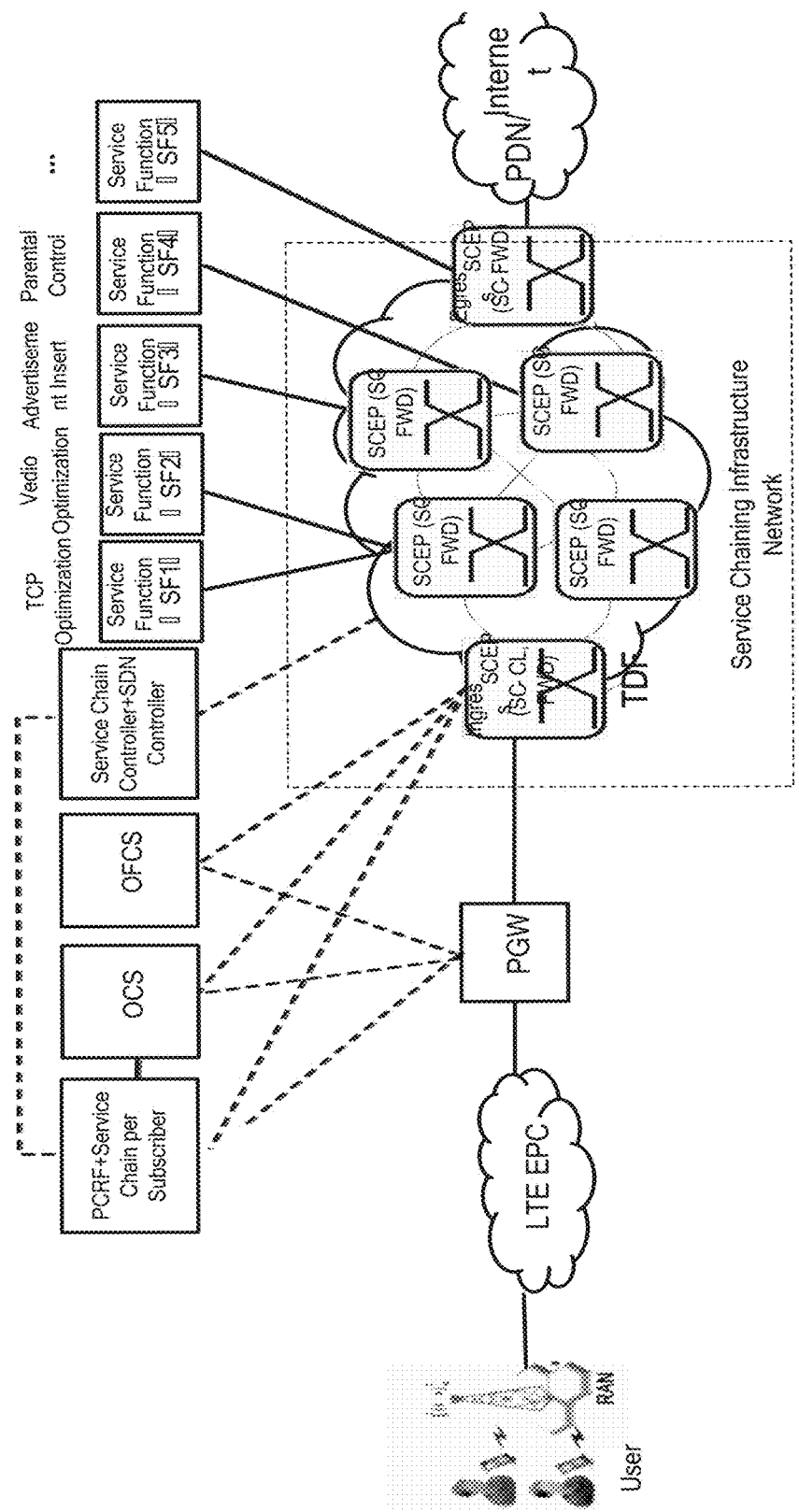
FIG. 3 shows a schematic diagram of performing policy and charging control to an application service chain based on an SDN network according to another preferred embodiment of the present invention.

FIG. 3 shows a schematic diagram of performing policy and charging control to an application service chain based on an SDN network according to another preferred embodiment of the present invention, wherein TDF and PGW are separated, and the TDF may act as the ingress SCEP.

Figure 4:
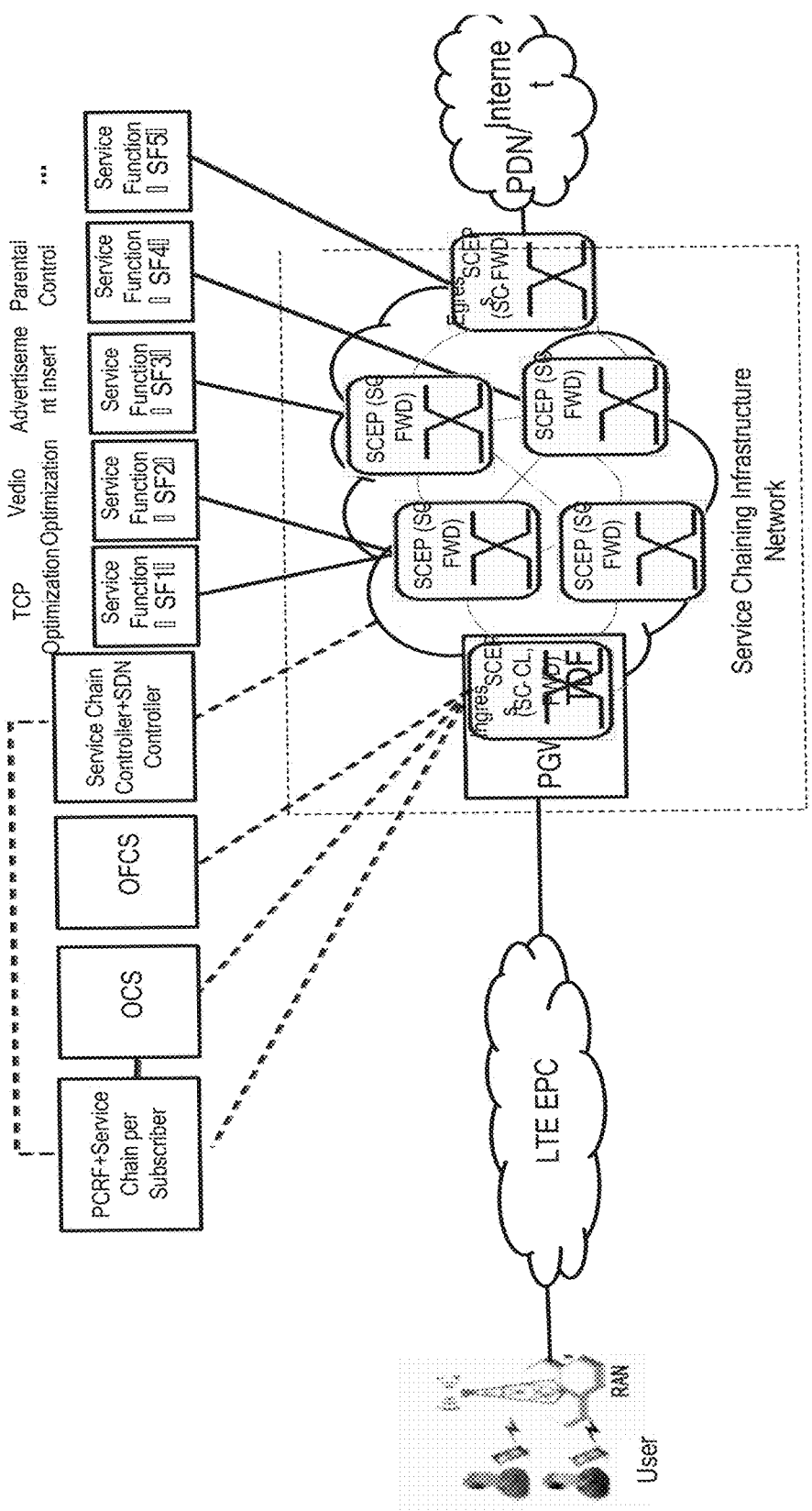
FIG. 4 shows a schematic diagram of performing policy and charging control to an application service chain based on an SDN network according to a further preferred embodiment of the present invention.

FIG. 4 shows a schematic diagram of performing policy and charging control to an application service chain based on an SDN network according to a further preferred embodiment of the present invention, wherein the TDF and the PGW are integrated together, and the TDF may act as the ingress SCEP.

Preferably, the TDF performs deep packet inspection to the application flow so as to perform diffluent processing to the application flow and forwards it to other SCEP(s).

Specifically, when the traffic detection function (TDF) act as an ingress SCEP, it performs the deep packet inspection (DPI) or shallow inspection to the application, so as to perform diffluent processing to the application flow, and forwards the application flow to the next SCEP, for example, forwarding the application flow to the next SCEP defined in the forwarding rule, which next SCEP further performs a corresponding service function to perform further packet processing, and forwards the data packet to the next SCEP to perform a corresponding function, and so forth.

Here, the TDF performs deep packet inspection or shallow inspection to the application or application flow. The deep packet inspection for example performs inspection to a stream media, P2P, VoIP, short message, browse, download, and multimedia, while the shallow inspection detects for example a port, destination station, protocol, and the like.

Here, the following interfaces are extended to support transferring the service chain AVP for each TDF application:

1) Sd interface between PCRF and TDF/PCEF The service chain information is included in ADC rule, which is dynamically provisioned to TDF/PCEF from PCRF, or service chain information is pre-configured in TDF/PCEF by operator.

2) Gyn online charging interface between TDF/PCEF and OCS. The service chain information for each TDF application is reported at MSCC.

3) Gz offline charging interface between TDF/PCRF and OFCS. The service chain information for each TDF application is reported at a service data container.

According to another aspect of the present invention, there is provided a PCRF for policy and charging control to an application service chain based on an SDN network.

The PCRF determines an application service chain for an application and transmits corresponding application service chain information to an SDN controller.

Specifically, the PCRF determines an application service chain for an application, for example, determining a corresponding service function for the application, or further, determining a corresponding application service chain based on multi-dimension context information corresponding to the application, and even further, the PCRF transmits the application service chain information to an SDN controller of an SDN network.

Here, the application service chain is an ordered list of service functions. The list may be rearranged. The concept of application service chain includes applying a plurality of service functions in a particular sequence. The service function may be used individually or used together with other service functions in the application service chain, such that the services provided by network carriers are available.

Here, the PCRF has an open API so as to interact with the SDN controller. Therefore, the PCRF may transmit application service chain information to the SDN controller.

Here, the PCRF capabilities are extended, which may not only define application detection and control rules for QoS control and charging, but also support determination of an application service chain for each application. Further, the PCRF may also bind an application to an associated service chain in consideration of subscriber multi-dimension attributes (such as customer segmentation, data charging plan, location, access technology, age, time period, . . .). In this way, the PCRF may dynamically define a corresponding application service chain for the application and subscriber.

Those skilled in the art should understand that the above manner of determining or transmitting an application service chain is only exemplary, and other existing or future possibly emerging manners of determining or transmitting an application service chain, if applicable to the present invention, should also be included within the scope of the present invention and are incorporated here by reference.

Preferably, the PCRF determines an application service chain of the application based on multi-dimension context information corresponding to the application.

Specifically, the PCRF determines the corresponding application service chain based on the multi-dimension context information corresponding to the application, such as the above customer segmentation, data charging plan, location, access technology, age, time period, and the like, for example, the application service chain resulting from the above consideration of the multi-dimension context information is called a value added application service chain, and transmits the value added application service chain to the SDN controller.

More preferably, the multi-context information comprises at least one of the following:

TDF application context information;
subscriber repository context information;
subscriber charging information;
subscriber radio access and location information.

Here, the TDF application context information: e.g., application flow description information layer 3 to layer 7, application sponsorship information, etc. The TDF application flow information can be obtained from the Application Function (AF) via Rx interface, or TDF application flow information can be detected by TDF and sent to PCRF to request ADC rule via Sd interface.

Here, the subscriber repository context information: e.g., subscriber allowed value added service, service priority, subscriber allowed QoS, subscriber category (enterprise, personal, adult, young, etc.), age, birthday, etc. The subscriber repository context information can be got from subscriber information database such as HSS (home subscriber server)/SPR (subscriber profile repository) via Sp interface per 3GPP PCC architecture. For example, the teenage user will perform the parental control value added service function, and the enterprise user will have the enterprise security service function, and the like.

Here, subscriber charging information: e.g., policy based spending counter status, which can be gotten via Sy interface with OCS.

Here, the multi-dimensional context information may also comprise subscriber radio access and location information: PCRF can acquire mobile network information such as radio access type and user location information from PGW. With this information, the PCRF can define service chain for subscriber's application. For example, when the user has a 3G/4G connection, the video traffic is steered via a video optimizer for smooth video streaming under low bandwidth condition. When the user has a WLAN connection, the video traffic needs no specific optimization and can be routed straight from the source to the user device.

The PCRF determines an application service chain of the application based on any of the above multi-dimensional context information corresponding to the application.

Those skilled in the art should understand that the above multi-dimension context information is only exemplary, and other existing or future possibly emerging multi-context information, if applicable to the present invention, should also be included within the protection scope of the present invention and is incorporated here by reference.

Preferably, based on the above multi-dimensional context information, the PCRF can add the value added service chain into the ADC rule on a given application flow.

The enhanced ADC rule will contain at least any one of the following information:

ADC rule identifier;
TDF application identifier;
Monitoring key;
Gate status;
QoS Information, e.g. UL maximum bit rate; DL maximum bit rate;
Charging Information, e.g. rate, online/offline charging or metering method;
Redirect Information;
Sponsored information;
Value Added Service Chain information.

Here, the value added service chain information AVP in ADC rules will include:

1) The service chain ID for the TDF application. The service chain ID will be new AVP and used for new tariff plan in Rating Engine.

2) One and more service functions with the specified traverse order.

Those skilled in the art should understand that the information included in the enhanced ADC rule is only exemplary, and other existing or future possibly emerging information included in the enhanced ADC rule, if applicable to the present invention, should also be included within the protection scope of the present invention and is incorporated here by reference.

According to another aspect of the present invention, there is provided an SDN controller for policy and charging control to an application service chain based on an SDN network.

The SDN controller receives application service chain information transmitted by a corresponding PCRF; determines a forwarding rule for a corresponding application based on the application service chain information and transmits the forwarding rule to a corresponding service chaining infrastructure network.

Specifically, the SDN controller receives application service chain information transmitted by a corresponding PCRF, determines a forwarding rule for the application based on the application service chain information, which forwarding rule, for example, includes how to perform a service function corresponding to the application service chain, the sequence of performing the service functions, etc., and then the SDN controller transmits the forwarding rule to the corresponding service chaining infrastructure network.

Here, the service chaining infrastructure network is a network composed of interconnecting SCEP(s) and service functions. A service function here is a network or application based packet treatment, application, computation or storage resource.

Here, the SDN controller may dynamically define a packet data forwarding rule for each subscriber's application flow. These forwarding rules steer the classified traffic flows to perform corresponding service functions in specific order as defined by the application service chain from PCRF.

According to another aspect of the present invention, there is provided SCEP(s) for policy and charging control to an application service chain based on an SDN network.

The SCEP(s) perform corresponding service function based on a forwarding rule transmitted by an SDN controller.

Here, the SCEP may be a physical node or a virtual node to perform a corresponding service function based on the forwarding rule. After a service function is performed, the SCEP forwards the data packet to the next SCEP for further packet handling.

Preferably, the SCEPs in the service chaining infrastructure network perform corresponding service functions in sequence based on the service function performing sequence in the forwarding rule.

Specifically, the forwarding rule includes performing sequence of service functions, and each SCEP performs the corresponding service functions in sequence based on the performing sequence.

For example, FIG. 2 shows an application data traffic of two subscribers, wherein different applications correspond to different service chains. After the PCRF determines an application service chain for the application, the application service chain information is transmitted to the SDN controller; the SDN controller determines different forwarding rules for the two subscribers based on the application service chain information, and transmits the forwarding rule to the service chaining infrastructure network; in the service chaining infrastructure network, different SCEPs corresponding to the two applications perform corresponding service functions based on the forwarding rule, respectively.

For example, the application of subscriber A (upper subscriber) corresponds to service function 1 and service function 4. After the PCRF determines a service application chain for the subscriber A, it sends the application service chain to the SDN controller; the SDN controller determines a forwarding rule to the subscriber A based on the application service chain information. Here, the TDF acts as an ingress SCEP. Two SCEPs in the upper row are called SCEP 1 and SCEP 2 from left to right; three SCEPs in the lower row are called SCEP3, SCEP4 and SCEP5 from left to right, respectively; then the forwarding rule, for example, defines the forwarding sequence of the application flow as from the ingress SCEP to SCEP1, and then from SCEP 1 to SCEP 4. After the SDN controller transmits the forwarding rule to the service chaining infrastructure network, the SCEPs in the service chaining infrastructure network perform corresponding service functions based on the forwarding rule. For example, the ingress SCEP performs diffluent processing and forwards the application flow to the SCEP1 which performs data packet processing to the received application flow so as to perform service function 1, and then forwards the application flow to the SCEP4. The SCEP 4 performs data packet processing to the received application flow to perform service function 4.

Similarly, the application of subscriber B (lower subscriber) corresponds to service function 2, service function 3, and service function 5. After the PCRF determines a service application chain for the subscriber B, it sends the application service chain to the SDN controller; the SDN controller determines a forwarding rule to the subscriber B based on the application service chain information. For example, the forwarding rule defines the forwarding sequence of the application flow as from the ingress SCEP to SCEP1, then from SCEP 1 to SCEP 2, and then from the SCEP 2 to SCEP 5. After the SDN controller transmits the forwarding rule to the service chaining infrastructure network, the SCEPs in the service chaining infrastructure network perform corresponding service functions based on the forwarding rule. For example, the ingress SCEP performs diffluent processing and forwards the application flow to the SCEP1 which performs data packet processing to the received application flow so as to perform service function 2, and then forwards the application flow to the SCEP2. The SCEP 2 performs data packet processing to the received application flow to perform service function 3 and then forwards the application flow to SCEP 5 which performs data packet processing to the received application so as to perform service function 5.

Here, the SCEP guarantees that the service functions of a list are traversed in a specific order. The specific order corresponds to application flows associated with the service function chain.

Those skilled in the art should understand that the above manner of performing service functions is only exemplary, and other existing or further possibly emerging manners of performing service functions, if applicable to the present invention, should also be included within the protection scope of the present invention and are incorporated here by reference.

Preferably, the SCEP includes a service chaining classification function and a service chaining forwarding function, wherein the service chaining classification function performs diffluent processing to the application flow of the application; and the service chaining forwarding function transmits the application flow to the service function and/or other SCEP(s).

Specifically, the SCEP includes a service chaining classification function (SC-CL) and a service chaining forwarding function (SC-FWD), wherein the service chaining classification function is a logical function part of an SCEP node to perform diffluent processing to the application flow of the application. When the data packet enters into the ingress SCEP, the SC-CL is mandatory to execute. The SC-CL classifies the incoming data packets/frames into different service flows based on their service characteristics or other policies.

The service chaining forwarding function (SC-FWD) is a logical function part of an SCEP node, to forward the application flow to the service function and/or other SCEP(s). The service chaining forwarding function is responsible for forwarding data packets to a service function, forwarding data packets to other SCEP nodes and to remove SC-IN (Service Chaining Infrastructure Network) specific information from data packets when there is an egress SC-IN. SC-FWD is mandatory to execute in all SCEP nodes.

According to another aspect of the present invention, there is provided a TDF for policy and charging control to an application service chain based on an SDN network.

The ingress SCEP in the SCEPs includes TDF. The TDF receives the application service chain information transmitted by the PCRF and transmits a charging request comprising the application service chain information to the corresponding OCS and/or OFCS, so as to charge the application.

Specifically, the TDF may act as an ingress SCEP. The TDF receives application service chain information transmitted from the PCRF via an Sd interface, and then the TDF transmits a charging request to the corresponding OCS via a Gyn interface, or transmits the charging request to the corresponding OFCS via a Gzn interface. The charging request includes the application service chain information. Next, the OCS and/or OFCS charge the application.

Here, besides passing the subscriber application flow and related value added service chain to the SDN, PCRF will also pass the service chain information in ADC rule to TDF/PECF. When the service chain information is obtained in TDF/PCEF, TDF/PCEF can send a charging request comprising the service chain information to an online charging system (OCS) and/or an offline charging system (OFCS). In this way, the OCS and/or OFCS can apply different charging plans to different applications with different application service chains. A brand new service chain information AVP (an AVP which contains a Service Chain ID) shall be added in Ro and Rf interfaces for the charging request. The service chain information AVP will allow a new charging mechanism within OCS and OFCS to charge the SDN open flow and service chaining accordingly. In this way, a carrier may provide different charging rules for applications having different QoS and different value added service functions.

Here, the TDF may be standalone or integrated with a PGW (Packet Gateway).

FIG. 3 shows a schematic diagram of performing policy and charging control to an application service chain based on an SDN network according to another preferred embodiment of the present invention, wherein TDF and PGW are separated, and the TDF may act as the ingress SCEP.

FIG. 4 shows a schematic diagram of performing policy and charging control to an application service chain based on an SDN network according to a further preferred embodiment of the present invention, wherein the TDF and the PGW are integrated together, and the TDF may act as the ingress SCEP.

Preferably, the TDF performs deep packet inspection to the application flow so as to perform diffluent processing to the application flow and forwards it to other SCEP(s).

Specifically, when the traffic detection function (TDF) act as an ingress SCEP, it performs the deep packet inspection (DPI) or shallow inspection to the application, so as to perform diffluent processing to the application flow, and forwards the application flow to the next SCEP, for example, forwarding the application flow to the next SCEP defined in the forwarding rule, which next SCEP further performs a corresponding service function to perform further packet processing, and forwards the data packet to the next SCEP to perform a corresponding function, and so forth.

Here, the TDF performs deep packet inspection or shallow inspection to the application or application flow. The deep packet inspection for example performs inspection to a stream media, P2P, VoIP, short message, browse, download, and multimedia, while the shallow inspection detects for example a port, destination station, protocol, and the like.

Here, the following interfaces are extended to support transferring the service chain AVP for each TDF application:

1) Sd interface between PCRF and TDF/PCEF. The service chain information is included in ADC rule, which is dynamically provisioned to TDF/PCEF from PCRF, or service chain information is pre-configured in TDF/PCEF by operator.

2) Gyn online charging interface between TDF/PCEF and OCS. The service chain information for each TDF application is reported at MSCC.

3) Gz offline charging interface between TDF/PCRF and OFCS. The service chain information for each TDF application is reported at a service data container.

According to a further aspect of the present invention, there is provided a system for policy charging and control to an application service chain based on an SDN network, comprising a PCRF above, an SDN controller above, an SCEP above, and a TDF above.

It should be noted that the present invention may be implemented in software and/or a combination of software and hardware, for example, it may be implemented by an application-specific integrated circuit ASIC, a general purpose computer or any other similar hardware device. In one embodiment, the software program of the present invention may be executed through a processor to implement the steps or functions as mentioned above. Likewise, the software program of the present invention (including relevant data structure) may be stored in the computer-readable recording medium, for example, RAM memory, magnetic or optic driver or flappy disk or similar devices. Besides, some steps or functions of the present invention may be implemented by hardware, for example, as a circuit cooperating with the processor to execute various steps or functions.

Besides, a part of the present invention may be applied as a computer program product, for example, a computer program instruction, which, when executed by a computer, through the operation of the computer, may invoke or provide the method and/or technical solution of the present invention. However, the program instruction invoking the method of the present invention may be stored in a fixed or mobile recording medium, and/or transmitted through a data stream in broadcast or other signal carrier medium, and/or stored in a working memory of a computer device running according to the program instruction. Here, one embodiment according to the present invention comprises an apparatus that includes a memory for storing computer program instructions and a processor for executing program instructions, wherein when the computer program instructions are executed by the processor, the apparatus is triggered to run the methods and/or technical solutions based on the previously mentioned multiple embodiments of the present invention.

To those skilled in the art, it is apparent that the present invention is not limited to the details of above exemplary embodiments, and the present invention can be implemented with other specific embodiments without departing the spirit or basic features of the present invention. Thus, from any perspective, the embodiments should be regarded as illustrative and non-limiting. The scope of the present invention is limited by the appended claims, instead of the above description. Thus, meanings of equivalent elements falling within the claims and all variations within the scope are intended to be included within the present invention. Any reference numerals in the claims should be regarded as limiting the involved claims. Besides, it is apparent that such terms as "comprise" and "include" do not exclude other units or steps, and a single form does not exclude a plural form. The multiple units or modules as stated in apparatus claims can also be implemented by a single unit or module through software or hardware. Terms such as first and second are used to represent names, not representing any specific sequence.

The invention claimed is:

1. A policy and charging control method for an application service chain based on a Software-Defined Network (SDN), comprising:
   determining, by a Policy and Charging Rule Function (PCRF), application service chain information for an application based on multi-dimensional context information corresponding to the application, the multi-dimensional context information including at least two of customer segment, data charging plan, access technology, age, time and location;
   transmitting, by the PCRF, the application service chain information to an SDN controller;
   determining, by the SDN controller, a forwarding rule for the application based on the application service chain information;
   transmitting, by the SDN controller, the forwarding rule to a corresponding service chaining infrastructure network; and
   performing, by one or more Service Chaining Enforcement Point (SCEPs) in the corresponding service chaining infrastructure network, at least one corresponding service function based on the forwarding rule.

2. The method according to claim 1, wherein the performing further includes
   performing, by the one or more SCEPs, a plurality of corresponding service functions in sequence based on a service function performing sequence in the forwarding rule.

3. The method according to claim 1, wherein at least one SCEP of the one or more SCEPs includes a service chaining classification function and a service chaining forwarding function; and
   the method further comprises
      performing, by the service chaining classification function, diffluent processing of an application flow of the application, and
      transmitting, by the service chaining forwarding function, the application flow to the at least one corresponding service function or another SCEP of the one or more SCEPs.

4. The method according to claim 1, wherein an ingress SCEP of the one or more SCEPs includes a Traffic Detection Function (TDF); and
   the method further comprises
      performing, by the TDF, a deep packet inspection of an application flow of the application so as to perform diffluent processing of the application flow,
      forwarding, by the TDF, the application flow to another SCEP of the one or more SCEPs after diffluent processing of the application flow is performed,
      receiving, by the TDF, the application service chain information transmitted by the PCRF, and
      transmitting, by the TDF, a charging request including the application service chain information to a corresponding Online Charging System (OCS) or Offline Charging System (OFCS), so as to charge the application.

5. The method according to claim 1, wherein the multi-dimensional context information includes at least any one of the following:
   TDF application context information;
   subscriber repository context information;
   subscriber charging information; and
   subscriber radio access and location information.

6. A PCRF for policy and charging control for an application service chain based on an SDN network, configured to:
   determine application service chain information for an application based on multi-dimensional context information corresponding to the application, the multi-dimensional context information including at least two of customer segment, data charging plan, access technology, age, time and location; and
   transmit the application service chain information to an SDN controller.

7. The PCRF according to claim 6, wherein the multi-dimensional context information includes at least any one of the following:
   TDF application context information;
   subscriber repository context information;
   subscriber charging information; and
   subscriber radio access and location information.

8. An SDN controller for policy and charging control for an application service chain based on an SDN network, configured to:
   receive application service chain information for an application transmitted by a corresponding PCRF, the application service chain information being based on multi-dimensional context information corresponding to the application, the multi-dimensional context information including at least two of customer segment, data charging plan, access technology, age, time and location;
   determine a forwarding rule for the application based on the application service chain information; and
   transmit the forwarding rule to a corresponding service chaining infrastructure network.

9. One or more SCEPs for policy and charging control for an application service chain based on an SDN network, configured to perform at least one corresponding service function based on a forwarding rule for an application transmitted by an SDN controller, the forwarding rule being based on multi-dimensional context information corresponding to the application, the multi-dimensional context information including at least two of customer segment, data charging plan, access technology, age, time and location.

10. The one or more SCEPs according to claim 9, wherein the one or more SCEPs are further configured to:
   perform corresponding service functions in sequence based on a service function performing sequence in the forwarding rule.

11. The one or more SCEPs according to claim 9, wherein the at least one SCEP of the one or more SCEPs includes a service chaining classification function and a service chaining forwarding function, the service chaining classification function performing diffluent processing of an application flow of the application, and the service chaining forwarding function transmitting the application flow to the at least one corresponding service function or at least another SCEP of the one or more SCEPs.

12. A TDF for policy and charging control for an application service chain based on an SDN network, wherein the TDF is included in an ingress SCEP, and configured to
   performs a deep packet inspection of an application flow of an application so as to perform diffluent processing of the application flow;
   forwards the application flow to another SCEPs after diffluent processing of the application flow is performed;
   receive application service chain information transmitted by a PCRF, the application service chain information being based on multi-dimensional context information corresponding to the application, the multi-dimensional context information including at least two of customer segment, data charging plan, access technology, age, time and location; and
   transmits a charging request including the application service chain information to a corresponding OCS or OFCS, so as to charge the application.

13. The TDF according to claim 12, wherein the TDF is integrated with a Packet Gateway (PGW).

* * * * *